US012168594B2

(12) United States Patent
Minami

(10) Patent No.: US 12,168,594 B2
(45) Date of Patent: Dec. 17, 2024

(54) CRANE AND CRANE CONTROL METHOD BASED ON CURRENT AND TARGET BOOM TIP AND LOAD POSITIONS

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 1024 days.

(21) Appl. No.: 17/256,520

(22) PCT Filed: Jul. 4, 2019

(86) PCT No.: PCT/JP2019/026622
§ 371 (c)(1),
(2) Date: Dec. 28, 2020

(87) PCT Pub. No.: WO2020/013071
PCT Pub. Date: Jan. 16, 2020

(65) Prior Publication Data
US 2021/0276838 A1 Sep. 9, 2021

(30) Foreign Application Priority Data
Jul. 9, 2018 (JP) ................................ 2018-129966

(51) Int. Cl.
*B66C 13/10* (2006.01)
*B66C 13/22* (2006.01)
*B66C 13/46* (2006.01)

(52) U.S. Cl.
CPC ............ *B66C 13/105* (2013.01); *B66C 13/22* (2013.01); *B66C 13/46* (2013.01); *B66C* *2700/088* (2013.01)

(58) Field of Classification Search
None
See application file for complete search history.

(56) References Cited

U.S. PATENT DOCUMENTS 7,426,423 B2 9/2008 Schneider et al.
2013/0245816 A1* 9/2013 Langer .................... B66C 13/02 700/228
(Continued)

FOREIGN PATENT DOCUMENTS

JP 2007-254082 A 10/2007
JP 2010-228905 A 10/2010
(Continued)

OTHER PUBLICATIONS

Acceleration, Jun. 20, 2018, Wikipedia, all. (Year: 2018).*
(Continued)

*Primary Examiner* — Brian P Sweeney
*Assistant Examiner* — Tawri M McAndrews
(74) *Attorney, Agent, or Firm* — Paratus Law Group, PLLC

(57) ABSTRACT

A crane is provided. The crane includes an acceleration sensor that detects the acceleration of a load, wherein a target velocity signal is converted into target location coordinates of the load, current location coordinates of a boom are calculated from a slewing angle, a luffing angle, and an expansion/contraction length, the spring constant of a wire rope is calculated from the previously calculated location of the load from a unit time earlier, the current location coordinates of the boom, and the current accelerations of the load as detected by the acceleration sensor, target location coordinates of the boom are calculated from the accelerations, the spring constant, and the target location coordinates of the load, and an actuator operation signal is generated.

3 Claims, 10 Drawing Sheets

(56) References Cited

U.S. PATENT DOCUMENTS

| | | | | |
|---|---|---|---|---|
| 2013/0245817 | A1 | 9/2013 | Schneider et al. | |
| 2015/0344271 | A1* | 12/2015 | Schneider ............... | B66C 13/06 701/50 |
| 2019/0119078 | A1* | 4/2019 | Palberg ................. | B66C 13/063 |
| 2020/0331737 | A1* | 10/2020 | Reischauer ............ | B25J 19/021 |

FOREIGN PATENT DOCUMENTS

| | | | |
|---|---|---|---|
| JP | 2013-184826 | A | 9/2013 |
| WO | WO 2004/106215 | A1 | 12/2004 |

OTHER PUBLICATIONS

Force, Jun. 19, 2018, Wikipedia, all. (Year: 2018).*

Jun. 29, 2021, Indian Examination Report issued for related IN application No. 202117000829.

* cited by examiner

CRANE AND CRANE CONTROL METHOD BASED ON CURRENT AND TARGET BOOM TIP AND LOAD POSITIONS

CROSS REFERENCE TO PRIOR APPLICATION

This application is a National Stage Patent Application of PCT International Patent Application No. PCT/JP2019/026622 (filed on Jul. 4, 2019) under 35 U.S.C. § 371, which claims priority to Japanese Patent Application No. 2018-129966 (filed on Jul. 9, 2018), which are all hereby incorporated by reference in their entirety.

TECHNICAL FIELD

The present invention relates to a crane and a method for controlling the crane.

BACKGROUND ART

Conventionally, as mobile cranes or the like, a crane in which each actuator is remotely manipulated has been proposed. In such crane, a relative positional relationship between the crane and a remote manipulation terminal varies depending on the state of work. Therefore, an operator needs to manipulate manipulation tools of the remote manipulation terminal with the positional relationship with the crane always taken into consideration. Therefore, a remote manipulation terminal and a crane that enable easy and simple manipulation of the crane by matching a manipulation direction of a manipulation tool of the remote manipulation terminal and an operating direction of the crane with each other irrespective of a relative positional relationship between the crane and the remote manipulation terminal has been known. For example, see Patent Literature (hereinafter abbreviated as PTL) 1.

The remote manipulation apparatus (remote manipulation terminal) described in PTL 1 transmits, for example, laser light having high straightness as a reference signal to the crane as a reference signal. Crane-side control apparatus 31 identifies a direction of the remote manipulation apparatus by receiving the reference signal from the remote manipulation apparatus and matches a coordinate system of the crane with a coordinate system of the remote manipulation apparatus. Consequently, the crane is manipulated according to a manipulative command signal from the remote manipulation apparatus, the manipulative command signal being generated with reference to a load. In other words, actuators of the crane are controlled based on commands relating to a moving direction and a moving speed of the load, and thus, it is possible to intuitively manipulate the crane without paying attention to an operating speed, an operating amount, an operating timing and the like of each of the actuators.

Based on the manipulative command signal from a manipulation section, the remote manipulation apparatus transmits a speed signal relating to a manipulation speed and a direction signal relating to a manipulation direction, to the crane. Therefore, in the crane, at a start or stop of movement at which a speed signal from the remote manipulation apparatus is input in the form of a step function, discontinuous acceleration is sometimes imposed on the load, causing swinging of the load. Also, the crane is controlled using the speed signal and the direction signal from the remote manipulation apparatus as a speed signal and a direction signal for a tip of the boom on the assumption that the tip of the boom is always located vertically above the load, it is impossible to curb occurrence of a positional shift and/or swinging of the load caused by the influence of a wire rope.

CITATION LIST

Patent Literature

PTL 1

Japanese Patent Application Laid-Open No. 2010-228905

SUMMARY OF INVENTION

Technical Problem

An object of the present invention is to provide a crane and method for controlling a crane that enable, when an actuator is controlled with reference to a load, moving the load along a target course while curbing swinging of the load.

Solution to Problem

The technical problem to be solved by the present invention has been stated above, and next, a solution to the problem will be explained.

A first aspect of the present invention is a crane in which an actuator of a boom is controlled based on a target speed signal relating to a moving direction and a speed of a load suspended from the boom by a wire rope, the crane including: a swivel angle detection section for the boom; a luffing angle detection section for the boom; an extension/retraction length detection section for the boom; and an acceleration detection section that detects an acceleration of a suspending tool or the load, in which the target speed signal is converted into a target position of the load relative to a reference position every predetermined unit time, a current position of a boom tip relative to the reference position is computed every unit time that is the unit time from a swivel angle detected by the swivel angle detection section, a luffing angle detected by the luffing angle detection section and an extension/retraction length detected by the extension/retraction length detection section, a spring constant of the wire rope is computed every unit time that is the unit time from a previously-computed position of the load the unit time before, the current position of the boom tip and a current acceleration of the suspending tool or the load, the current acceleration being detected every unit time that is the unit time by the acceleration detection section, a target position of the boom tip for the target position of the load is computed every unit time that is the unit time from the current acceleration of the suspending tool or the load, the spring constant of the wire rope and the target position of the load, and an operation signal for the actuator is generated every unit time that is the unit time, based on the target position of the boom tip.

A second aspect of the present invention is the crane, in which a relationship between the target position of the boom tip and the target position of the load is expressed by Expression 1 based on an acceleration of the load, a weight of the load, the spring constant of the wire rope and the target position of the load, the spring constant of the wire rope is computed from the previously-computed position of the load the predetermined unit time before, the current position of the boom tip and the current acceleration of the suspending tool or the load using Expression 1 every unit time that is the unit time, and the target position of the boom tip for the target position of the load is computed from the current acceleration of the suspending tool or the load, the spring constant of the wire rope and the target position of the load using Expression 1 every unit time that is the unit time:

[1]

$$m\ddot{p}=mg+f=mg+k_f(q-p) \quad (1)$$

where f is a tension of the wire rope, kf is the spring constant, m is a mass of the load, q is the current position or the target position of the tip of the boom, p is the current position or the target position of the load and g is a gravitational acceleration.

A third aspect of the present invention is a method for controlling a crane in which an actuator of a boom is controlled based on a target speed signal relating to a moving direction and a speed of a load suspended from the boom by a wire rope, the method including: a target-course computation process of converting the target speed signal into a target position of the load relative to a reference position every predetermined unit time; a boom-position computation process of computing a spring constant of the wire rope every unit time that is the unit time from a previously-computed position of the load the unit time before, a current position of a boom tip relative to the reference position and a current acceleration of the suspending tool or the load, the current acceleration being detected every unit time that is the unit time by the acceleration detection section, and computing a target position of the boom tip for the target position of the load every unit time that is the unit time from the current acceleration of the suspending tool or the load, the spring constant of the wire rope and the target position of the load; and an operation-signal generation process of generating an operation signal for the actuator based on the target position of the boom tip every unit time that is the unit time.

Advantageous Effects of Invention

The present invention produces effects as stated below.

In the first aspect of the invention and the third aspect of the invention, since a target position of the boom tip for a target position of a load is computed from a current acceleration of the suspending tool or the load, the spring constant of the wire rope and the target position of the load, the boom is controlled such that the load is moved along a target course based on the acceleration imposed on the suspending tool or the load while the crane is manipulated with reference to the load. Consequently, it is possible to, when the actuator is controlled with reference to the load, move the load along the target course while curbing swinging of the load.

In the second aspect of the invention, detection of the acceleration of the suspending tool or the load allows computation of the spring constant of the wire rope in Expression 1 and thus allows computation of the target position of the boom tip based on the acceleration of the load from the acceleration of the suspending tool or the load, a current position of the boom tip and the target position of the load. Consequently, it is possible to, when the actuator is controlled with reference to the load, move the load along the target course while curbing swinging of the load, with a simple measurement apparatus.

DESCRIPTION OF EMBODIMENTS

As a working vehicle according to an embodiment of the present invention, crane 1, which is a mobile crane (rough terrain crane), will be described below with reference to FIGS. 1 to 4. Note that although the present embodiment will be described in terms of crane (rough terrain crane) as a working vehicle, the working vehicle may also be an all-terrain crane, a truck crane, a truck loader crane, an aerial work vehicle, or the like.

Figure 1:
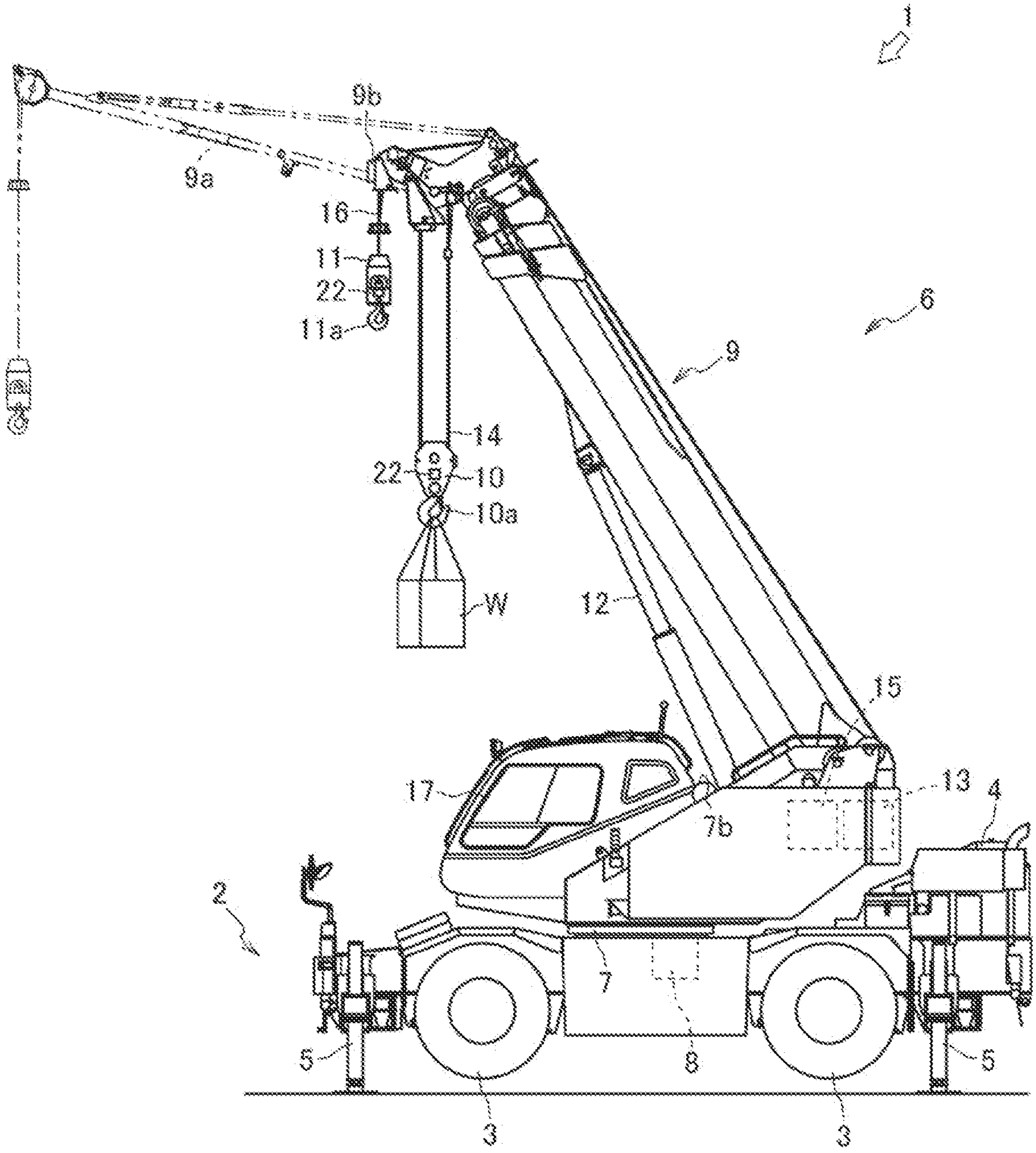
FIG. 1 is a side view illustrating an overall configuration of a crane.

As illustrated in FIG. 1, crane 1 is a mobile crane capable of moving to an unspecified place. Crane 1 includes vehicle 2 and crane apparatus 6, which is a working apparatus.

Vehicle 2 carries crane apparatus 6. Vehicle 2 includes a plurality of wheels 3 and travels using engine 4 as a power source. Vehicle 2 is provided with outriggers 5. Outriggers 5 are composed of projecting beams hydraulically extendable on opposite sides in a width direction of vehicle 2 and hydraulic jack cylinders extendable in a direction perpendicular to the ground. Vehicle 2 can expand a workable region of crane 1 by extending outriggers 5 in the width direction of vehicle 2 and bringing the jack cylinders into contact with the ground.

Crane apparatus 6 is a working apparatus that hoists up load W with a wire rope. Crane apparatus 6 includes, for example, swivel base 7, boom 9, jib **9*a*, main hook block 10, sub hook block 11, hydraulic luffing cylinder 12, main winch 13, main wire rope 14, sub winch 15, sub wire rope 16, cabin 17, control apparatus 31 and a manipulation terminal 32**.

Swivel base 7 is a swivel base that allows crane apparatus 6 to swivel. Swivel base 7 is disposed on a frame of vehicle 2 via an annular bearing. Swivel base 7 is configured to be rotatable with a center of the annular bearing as a rotational center. Swivel base 7 is provided with the plurality of swivel-base cameras **7*a* that monitor the surroundings. Also, swivel base 7 is provided with hydraulic swivel motor 8, which is an actuator. Swivel base 7 is configured to be capable of swiveling in one and other directions via hydraulic swivel motor 8**.

As illustrated in FIG. 1, hydraulic swivel motor 8, which is an actuator, is manipulated to rotate via swivel valve 23 (see FIG. 3), which is an electromagnetic proportional switching valve. Swivel valve 23 can control a flow rate of an operating oil supplied to hydraulic swivel motor 8 to any flow rate. In other words, swivel base 7 is configured to be controllable to have any swivel speed via hydraulic swivel motor 8 manipulated to rotate via swivel valve 23. Swivel base 7 is provided with swivel sensor 27 (see FIG. 3), which is a swivel angle detection section that detects swivel angle θz (angle) and swivel speed θz of swivel base 7.

Boom 9 is a movable boom that supports a wire rope such that load W can be hoisted. Boom 9 is composed of a plurality of boom members. In boom 9, a base end of a base boom member is swingably provided at a substantial center of swivel base 7. Boom 9 is configured to be capable of being axially extended/retracted by moving the respective boom members with a non-illustrated hydraulic extension/retraction cylinder, which is an actuator. Also, boom 9 is provided with jib 9*a*.

The non-illustrated hydraulic extension/retraction cylinder, which is an actuator, is manipulated to extend and retract via extension/retraction valve 24 (see FIG. 3), which is electromagnetic proportional switching valve. Extension/retraction valve 24 can control a flow rate of an operating oil supplied to the hydraulic extension/retraction cylinder to any flow rate. Boom 9 is provided with extension/retraction sensor 28, which is an extension/retraction length detection section that detects a length of boom 9 and azimuth sensor 29 that detects an azimuth with a tip of boom 9 as a center.

Boom camera 9*b*, which is a sensing apparatus, is an image obtainment section that takes an image of load W and features around load W. Boom camera 9*b* is provided at a tip portion of boom 9. Boom camera 9*b* is configured to be capable of taking an image of load W, and features and geographical features around crane 1 from vertically above load W.

Main hook block 10 and sub hook block 11 are members for suspending load W. Main hook block 10 is provided with a plurality of hook sheaves around which main wire rope 14 is wound and main hook 10*a* for suspending load W. Sub hook block 11 is provided with sub hook 11*a* for suspending load W. Each of main hook block 10 and sub hook block 11 is provided with acceleration sensor 22 that detects accelerations Gx(n), Gy(n), Gz(n) in three axial directions. Each acceleration sensor 22 is capable of indirectly detecting accelerations Gx(n), Gy(n), Gz(n) imposed on load W that is being carried. Each acceleration sensor 22 is configured to be capable of transmitting detected values to control apparatus 31 via a wire or wirelessly. Note that acceleration sensor 22 may directly be installed on load W suspended via main hook block 10 or sub hook block 11.

Hydraulic luffing cylinder 12 is an actuator that luffs up and down boom 9 and holds a posture of boom 9. In hydraulic luffing cylinder 12, an end portion of a cylinder part is swingably coupled to swivel base 7 and an end portion of a rod part is swingably coupled to the base boom member of boom 9. Hydraulic luffing cylinder 12 is manipulated to extend or retract via luffing valve 25 (see FIG. 3), which is an electromagnetic proportional switching valve. Luffing valve 25 can control a flow rate of an operating oil supplied to hydraulic luffing cylinder 12 to any flow rate. Boom 9 is provided with luffing sensor 30 (see FIG. 3), which is a luffing angle detection section that detects luffing angle θx.

Main winch 13 and sub winch 15 are actuators that pull in (wind) or let out (unwind) main wire rope 14 and sub wire rope 16. Main winch 13 is configured such that a main drum around which main wire rope 14 is wound is rotated by a non-illustrated main hydraulic motor, which is an actuator, and sub winch 15 is configured such that a sub drum around which sub wire rope 16 is wound is rotated by a non-illustrated sub hydraulic motor, which is an actuator.

The main hydraulic motor is manipulated to rotate via main valve 26*m* (see FIG. 3), which is an electromagnetic proportional switching valve. Main winch 13 is configured to be capable of being manipulated so as to have any pulling-in and letting-out speeds, by controlling the main hydraulic motor via main valve 26*m*. Likewise, sub winch 15 is configured to be capable of being manipulated so as to have any pulling-in and letting-out speeds, by controlling the sub hydraulic motor via sub valve 26*s* (see FIG. 3), which is an electromagnetic proportional switching valve. Main winch 13 and sub winch 15 are provided with winding sensors 34 (see FIG. 3) that detect let-out amounts I of main wire rope 14 and sub wire rope 16, respectively.

Cabin 17 is a housing that covers an operator compartment. Cabin 17 is mounted on swivel base 7. Cabin 17 is provided with a non-illustrated operator compartment. The operator compartment is provided with manipulation tools for manipulating vehicle 2 to travel, and swivel manipulation tool 18, luffing manipulation tool 19, extension/retraction manipulation tool 20, main drum manipulation tool 21*m*, sub drum manipulation tool 21*s* and manipulation terminal 32 and the like for manipulating crane apparatus 6 (see FIG. 3). Hydraulic swivel motor 8 is manipulatable with swivel manipulation tool 18. Hydraulic luffing cylinder 12 is manipulatable with luffing manipulation tool 19. The hydraulic extension/retraction cylinder is manipulatable with extension/retraction manipulation tool 20. The main hydraulic motor is manipulatable with main drum manipulation tool 21*m*. The sub hydraulic motor is manipulatable with sub drum manipulation tool 21*s*.

Figure 2:
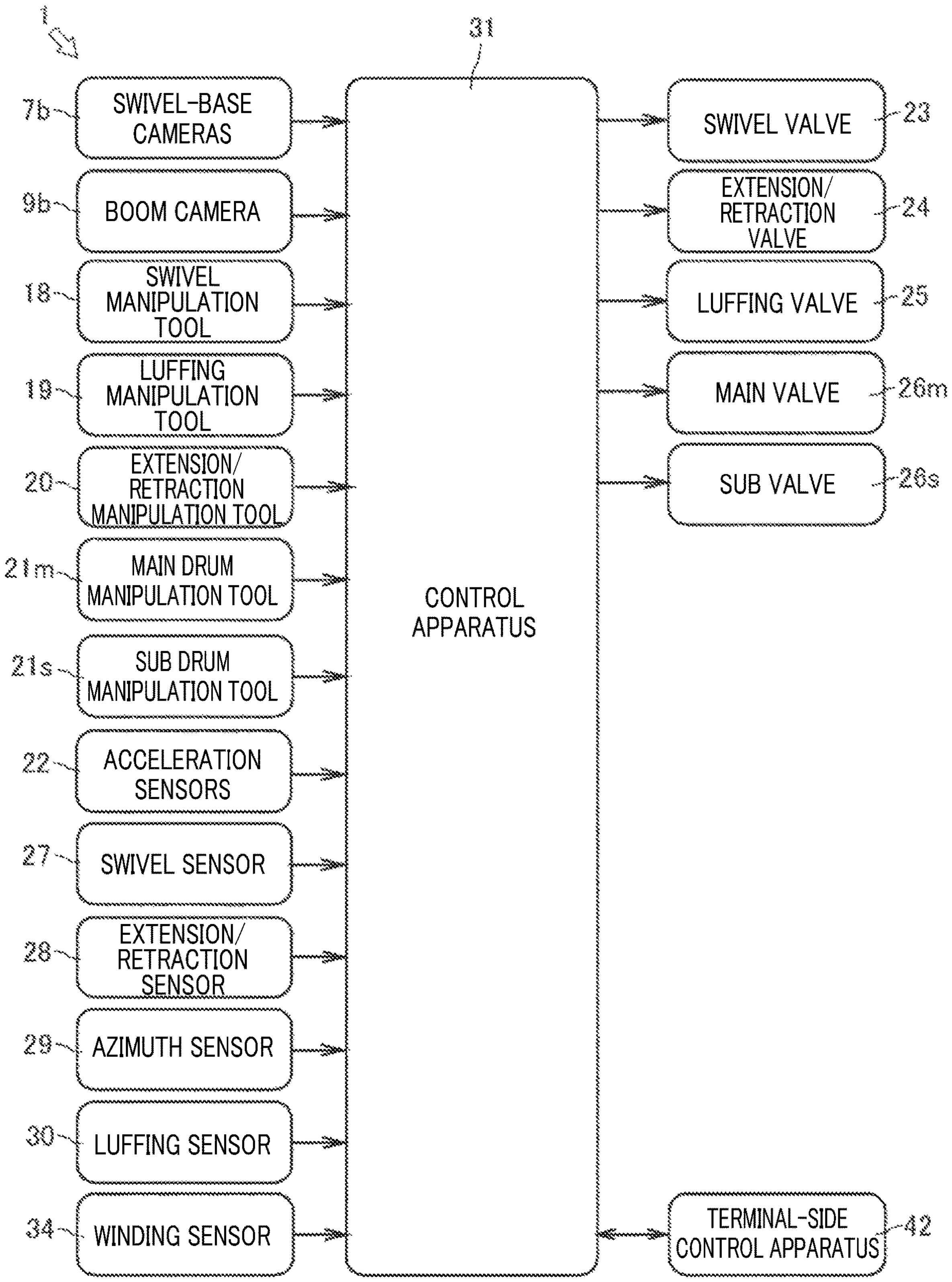
FIG. 2 is a block diagram illustrating a control configuration of the crane.

As illustrated in FIG. 2, control apparatus 31 controls the actuators of crane apparatus 6 via the manipulation valves. Control apparatus 31 is disposed inside cabin 17. Substantively, control apparatus 31 may have a configuration in which a CPU, a ROM, a RAM, an HDD and/or the like are connected to one another via a bus or may be composed of a one-chip LSI or the like. Control apparatus 31 stores various programs and/or data in order to control operation of the actuators, the switching valves, the sensors and/or the like.

Control apparatus 31 is connected to boom camera 9*b*, swivel manipulation tool 18, luffing manipulation tool 19, extension/retraction manipulation tool 20, main drum manipulation tool 21*m* and sub drum manipulation tool 21*s*, and is capable of obtaining image i2 from boom camera 9*b* and obtaining respective manipulation amounts of swivel manipulation tool 18, luffing manipulation tool 19, main drum manipulation tool 21*m* and sub drum manipulation tool 21*s*.

Control apparatus 31 is capable of obtaining a control signal from manipulation terminal 32 and transmitting, for example, control information from crane apparatus 6, image i1 from swivel-base cameras 7*b* and image i2 from boom camera 9*b*.

Control apparatus 31 is connected to terminal-side control apparatus 41 (see the figure) of manipulation terminal 32 and is capable of obtaining a control signal from manipulation terminal 32.

Control apparatus 31 is connected to swivel valve 23, extension/retraction valve 24, luffing valve 25, main valve 26*m* and sub valve 26*s*, and is capable of transmitting operation signals Md to swivel valve 23, luffing valve 25, main valve 26*m* and sub valve 26*s*.

Control apparatus 31 is connected to acceleration sensor 22, swivel sensor 27, extension/retraction sensor 28, azimuth sensor 29, luffing sensor 30 and winding sensor 34, and is capable of obtaining swivel angle θz of swivel base 7, extension/retraction length Lb and luffing angle θx of boom 9, three-axis accelerations Gx(n), Gy(n), Gz(n) of main hook block 10 or sub hook block 11, let-out amount l(n) and an azimuth of main wire rope 14 or sub wire rope 16 (hereinafter simply referred to as "wire rope").

Control apparatus 31 generates operation signals Md for swivel manipulation tool 18, luffing manipulation tool 19, main drum manipulation tool 21*m* and sub drum manipulation tool 21*s* based on manipulation amounts of the respective manipulation tools.

Crane 1 configured as described above is capable of moving crane apparatus 6 to any position by causing vehicle 2 to travel. Crane 1 is also capable of increasing a lifting height and/or an operating radius of crane apparatus 6, for example, by luffing up boom 9 to any luffing angle θx with hydraulic luffing cylinder 12 by means of manipulation of luffing manipulation tool 19 and/or extending boom 9 to any length of boom 9 by means of manipulation of extension/retraction manipulation tool 20. Crane 1 is also capable of carrying load W by hoisting up load W with sub drum manipulation tool 21*s* and/or the like and causing swivel base 7 to swivel by means of manipulation of swivel manipulation tool 18.

Figure 3:
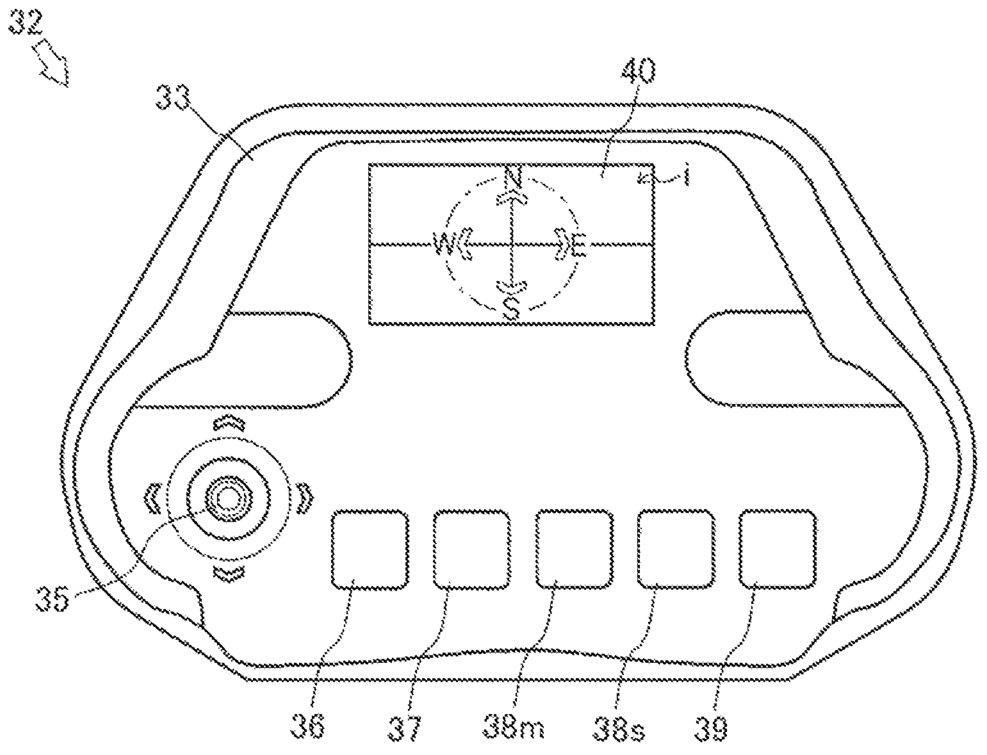
FIG. 3 is a plan view illustrating a schematic configuration of a remote manipulation terminal.
Figure 4:
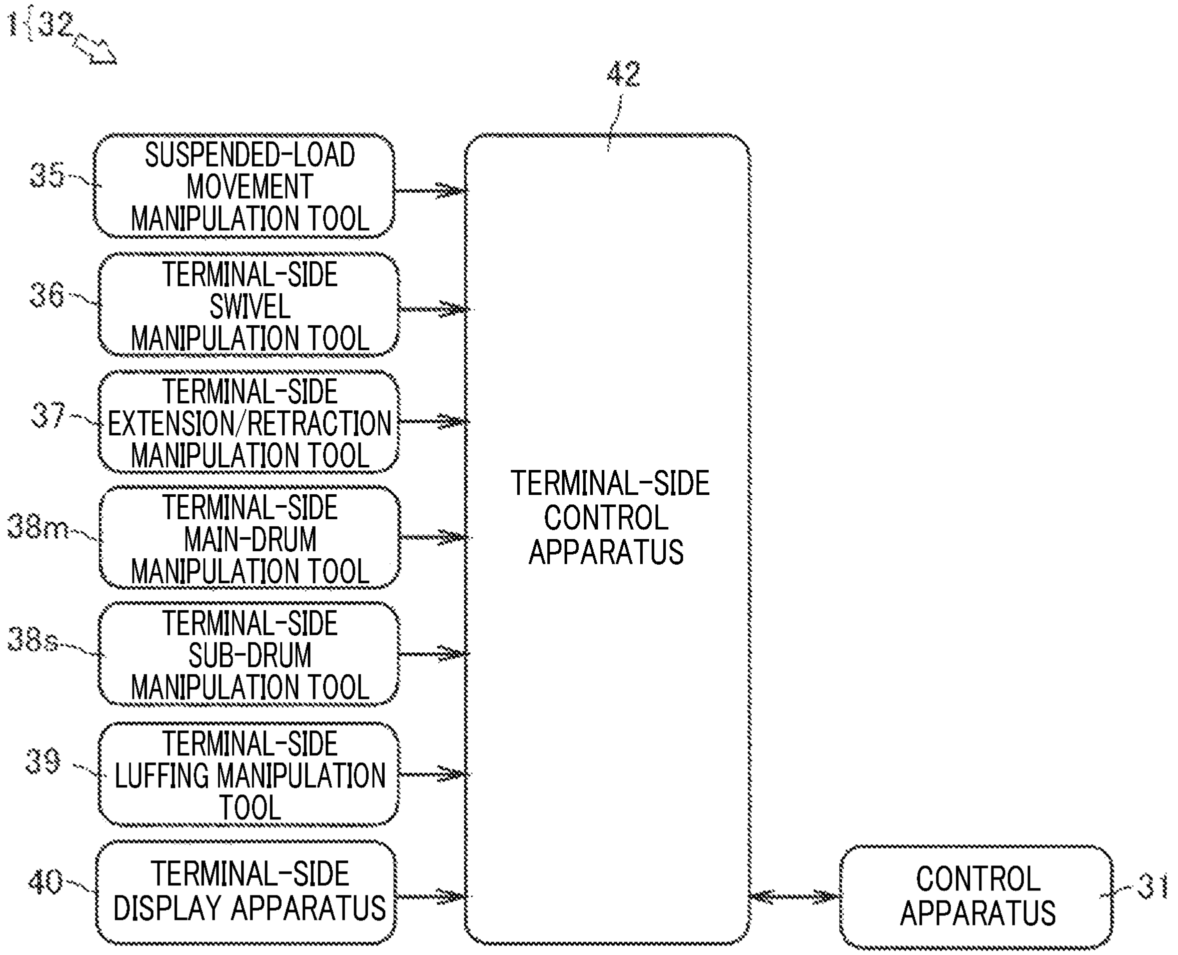
FIG. 4 is a block diagram illustrating a control configuration of the remote manipulation terminal.

As illustrated in FIGS. 3 and 4, manipulation terminal 32 is a terminal with which target speed signal Vd relating to a direction and a speed of movement of load W is input. Manipulation terminal 32 includes: for example, housing 33; suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39 and terminal-side display apparatus 40 disposed on a manipulation surface of housing 33; and terminal-side control apparatus 41 (see FIGS. 2 and 4). Manipulation terminal 32 transmits target speed signal Vd of load W that is generated by manipulation of suspended-load movement manipulation tool 35 or any of the manipulation tools to control apparatus 31 of crane 1 (crane apparatus 6).

As illustrated in FIG. 3, housing 33 is a main component of manipulation terminal 32. Housing 33 is formed as a housing having a size that allows the operator to hold the housing with his/her hand. Suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39 and terminal-side display apparatus 40 are installed on the manipulation surface of housing 33.

As illustrated in FIGS. 3 and 4, suspended-load movement manipulation tool 35 is a manipulation tool with which an instruction on a direction and a speed of movement of load W in a horizontal plane is input. Suspended-load movement manipulation tool 35 is composed of a manipulation stick erected substantially perpendicularly from the manipulation surface of housing 33 and a non-illustrated sensor that detects a tilt direction and a tilt amount of the manipulation stick. Suspended-load movement manipulation tool 35 is configured such that the manipulation stick can be manipulated to be tilted in any direction. Suspended-load movement manipulation tool 35 is configured to transmit a manipulation signal on the tilt direction and the tilt amount of the manipulation stick detected by the non-illustrated sensor with an upward direction in plan view of the manipulation surface (hereinafter simply referred to as "upward direction") as a direction of extension of boom 9, to terminal-side control apparatus 41.

Terminal-side swivel manipulation tool 36 is a manipulation tool with which an instruction on a swivel direction and a speed of crane apparatus 6 is input. Terminal-side extension/retraction manipulation tool 37 is a manipulation tool with which an instruction on extension/retraction and a speed of boom 9 is input. Terminal-side main drum manipulation tool 38*m* (terminal-side sub drum manipulation tool 38*s*) is a manipulation tool with which an instruction on a rotation direction and a speed of main winch 13 is input. Terminal-side luffing manipulation tool 39 is a manipulation tool with which an instruction on luffing and a speed of boom 9 is input. Each manipulation tool is composed of a manipulation stick substantially perpendicularly erected from the manipulation surface of housing 33 and a non-illustrated sensor that detects a tilt direction and a tilt amount of the manipulation stick. Each manipulation tool is configured to be tiltable to one side and the other side.

Terminal-side display apparatus 40 displays various kinds of information such as postural information of crane 1, information on load W and/or the like. Terminal-side display apparatus 40 is configured by an image display apparatus such as a liquid-crystal screen or the like. Terminal-side display apparatus 40 is provided on the manipulation surface of housing 33. Terminal-side display apparatus 40 displays an azimuth with the direction of extension of boom 9 as the upward direction in plan view of terminal-side display apparatus 40.

As illustrated in FIG. 4, terminal-side control apparatus 41, which is a control section, controls manipulation terminal 32. Terminal-side control apparatus 41 is disposed inside housing 33 of manipulation terminal 32. Substantively, terminal-side control apparatus 41 may have a configuration in which a CPU, a ROM, a RAM, an HDD and/or the like are connected to one another via a bus or may be composed of a one-chip LSI or the like. Terminal-side control apparatus 41 stores various programs and/or data in order to control operation of suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39, terminal-side display apparatus 40 and/or the like.

Terminal-side control apparatus 41 is connected to suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39, and is capable of obtaining manipulation signals each including a tilt direction and a tilt amount of the manipulation stick of the relevant manipulation tool.

Terminal-side control apparatus 41 is capable of generating target speed signal Vd for load W every unit time t from manipulation signals of the respective sticks, the manipulation signals being obtained from the respective sensors of terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39. Also, terminal-side control apparatus 41 is connected to control apparatus 31 of crane apparatus 6 wirelessly or via a wire, and is capable of transmitting generated target speed signal Vd of load W to control apparatus 31 of crane apparatus 6. In the present embodiment, it is assumed that unit time t(n) is unit time t that is a n-th computation period from a manipulation of tiling suspended-load movement manipulation tool 35 and unit time t(n+1) is unit time t one period after the n-th period.

Next, control of crane apparatus 6 by manipulation terminal 32 will be described with reference to FIG. 5.

Figure 5:
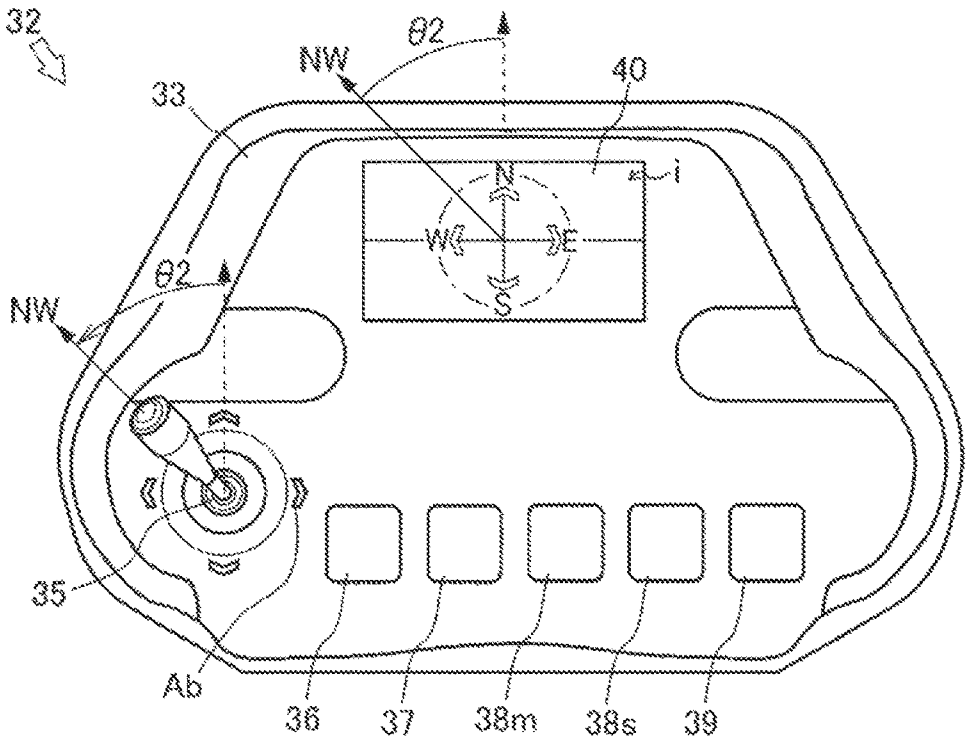
FIG. 5 illustrates the remote manipulation terminal where a suspended-load movement manipulation tool is manipulated.

As illustrated in FIG. 5, when suspended-load movement manipulation tool 35 of manipulation terminal 32 is manipulated to be tilted leftward to a direction in which tilt angle θ2 is 45° relative to the upward direction by an arbitrary tilt amount in a state in which the tip of boom 9 faces north, terminal-side control apparatus 41 obtains a manipulation signal on a tilt direction and a tilt amount of a tilt to northwest, which is the direction in which tilt angle θ2 is 45°, from north, which is an extension direction of boom 9, from the non-illustrated sensor of suspended-load movement manipulation tool 35. Furthermore, terminal-side control apparatus 41 computes target speed signal Vd for moving load W to northwest at a speed according to the tilt amount from the obtained manipulation signal, every unit time t. Manipulation terminal 32 transmits computed target speed signal Vd to control apparatus 31 of crane apparatus 6 every unit time t.

Upon receiving target speed signal Vd from manipulation terminal 32 every unit time t, control apparatus 31 computes target course signal Pd of load W based on an azimuth of the tip of boom 9, the azimuth being obtained from azimuth sensor 29. Furthermore, control apparatus 31 computes target position coordinate p(n+1) of load W, which is a target position of load W, from target course signal Pd. Control apparatus 31 generate respective operation signals Md for swivel valve 23, extension/retraction valve 24, luffing valve 25, main valve 26*m* and sub valve 26*s* to move load W to target position coordinate p(n+1) (see FIG. 7). Crane 1 moves load W toward northwest, which is the tilt direction of suspended-load movement manipulation tool 35, at a speed according to the tilt amount. In this case, crane 1 controls hydraulic swivel motor 8, a hydraulic extension/retraction cylinder, hydraulic luffing cylinder 12, the main hydraulic motor and/or the like based on the operation signals Md.

Crane 1 configured as described above obtains target speed signal Vd on a moving direction and a speed based on a direction of manipulation of suspended-load movement manipulation tool 35 with reference to the extension direction of boom 9, from manipulation terminal 32 every unit time and determines target position coordinate p(n+1) of load W, and prevents the operator from lose recognition of a direction of operation of crane apparatus 6 relative to a direction of manipulation of suspended-load movement manipulation tool 35. In other words, a direction of manipulation of suspended-load movement manipulation tool 35 and a direction of movement of load W are computed based on the extension direction of boom 9, which is a common reference. Consequently, it is possible to easily and simply manipulate crane apparatus 6. Note that although in the present embodiment, manipulation terminal 32 is provided inside cabin 17, but may be configured as a remote manipulation terminal that can remotely be manipulated from the outside of cabin 17, by providing a terminal-side wireless device.

Next, a first embodiment of a control process for computing target course signal Pd for load W, target course signal Pd being provided for generating operation signals Md, and target position coordinate q(n+1) of the tip of boom 9 in control apparatus 31 of crane apparatus 6 will be described with reference to FIGS. 6 to 11. Control apparatus 31 includes target course computation section 31*a*, boom position computation section 31*b* and operation signal generation section 31*c*.

Figure 6:
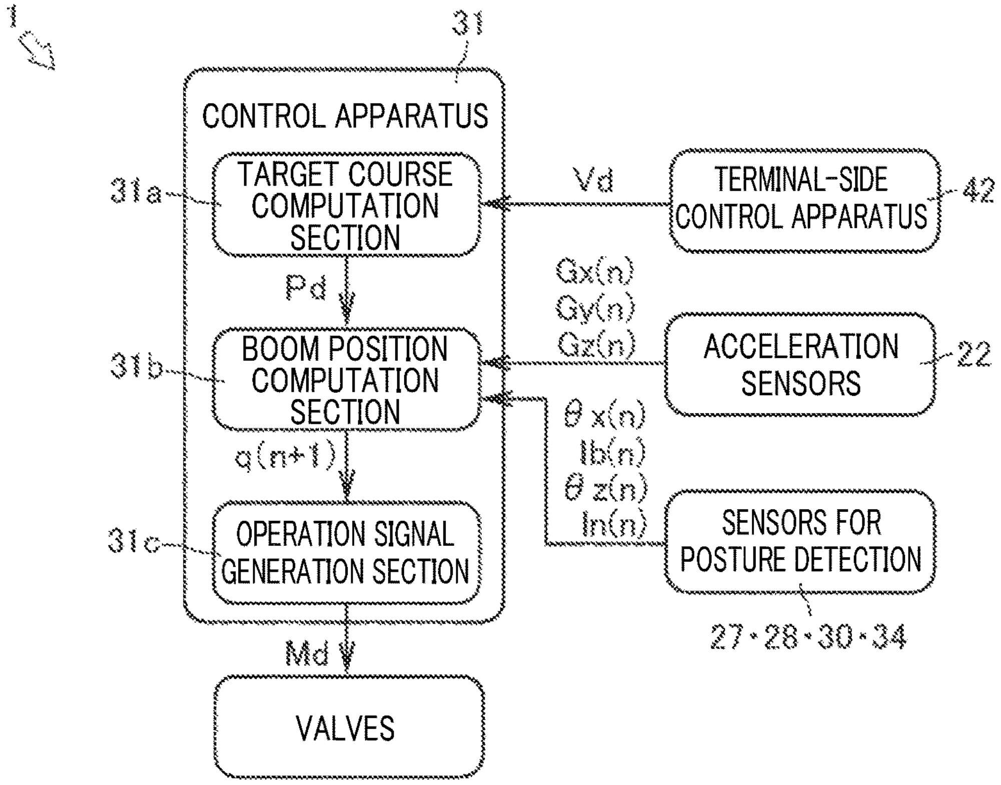
FIG. 6 is a block diagram illustrating a control configuration of a control apparatus of the crane.

As illustrated in FIG. 6, target course computation section 31*a* is a part of control apparatus 31 and converts target speed signal Vd for load W into target course signal Pd for load W. Target course computation section 31*a* can obtain target speed signal Vd for load W, which is composed of a moving direction and a speed of load W, from terminal-side control apparatus 42 of manipulation terminal 32 every unit time t. Also, target course computation section 31*a* can compute target positional information for load W by integrating obtained target speed signal Vd. Target course computation section 31*a* is also configured to apply low-pass filter Lp to the target positional information for load W to convert target positional information for load W into target course signal Pd, which is target positional information for load W, every unit time t.

Low-pass filter Lp attenuates frequencies that are equal to or higher than a predetermined frequency. Target course computation section 31*a* prevents occurrence of a singular point (abrupt positional change) caused by a differential operation, by applying low-pass filter Lp to target course signal Pd. Although in the present embodiment, for low-pass filter Lp, fourth-order low-pass filter Lp is used to deal with a fourth-order differentiation in computation of spring constant kf(n), low-pass filter Lp of an order according to desired characteristics can be employed. Each of a and b in Expression 2 is a coefficient.

$$G(s) = \frac{a}{(s+b)^4} \tag{2}$$

Figure 7:
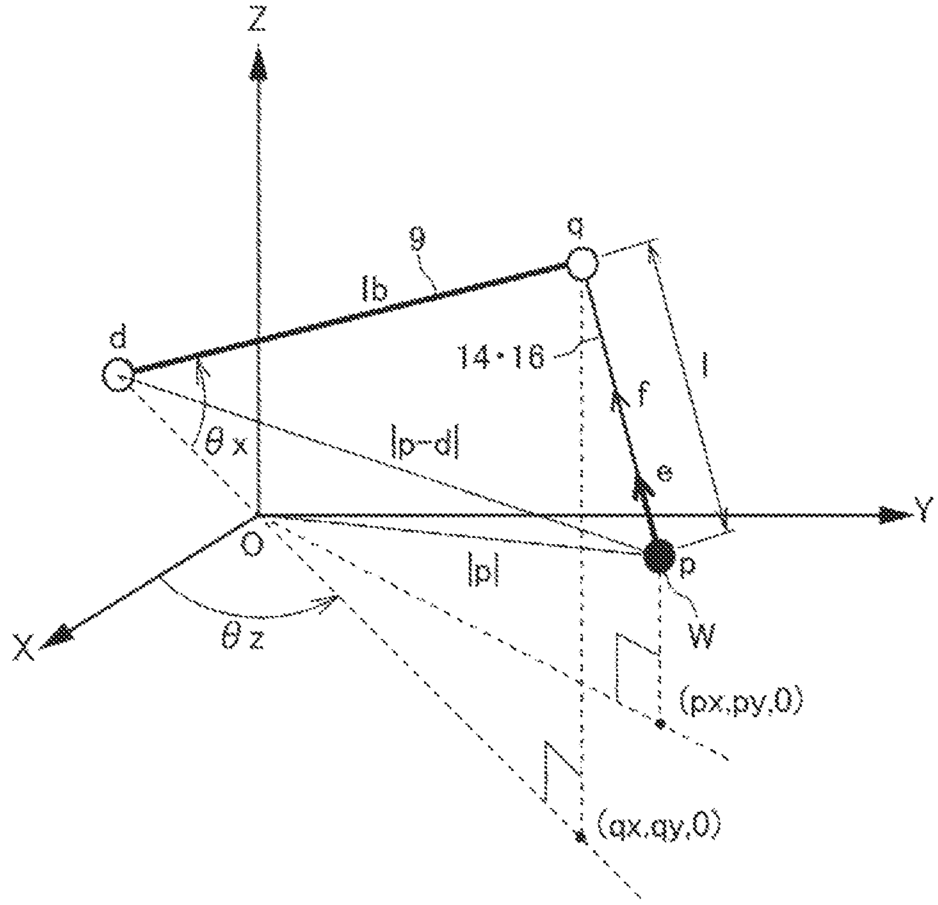
FIG. 7 is a diagram illustrating an inverse dynamics model of the crane.

As illustrated in FIG. 7, an inverse dynamics model for crane 1 is defined. The inverse dynamics model is defined on a XYZ coordinate system, and origin O, which is a reference position, is a center of swivel of crane 1. The sign q denotes, for example, current position coordinate q(n) and p denotes, for example, current position coordinate p(n) of load W. The sign lb denotes, for example, extension/retraction length lb(n) of boom 9 and θx denotes, for example, luffing angle θx(n), and θz denotes, for example, swivel angle θz(n). The sign 1 denotes, for example, let-out amount l(n) of the wire rope, and f denotes tension f of the wire rope.

As illustrated in FIGS. 6 and 7, boom position computation section 31*b* is a part of control apparatus 31 and computes a position coordinate of the tip of boom 9 from postural information of boom 9 and target course signal Pd for load W. Boom position computation section 31*b* can obtain target course signal Pd from target course computation section 31*a*. Boom position computation section 31*b* can obtain swivel angle θz(n) of swivel base 7 from swivel sensor 27, obtain extension/retraction length lb(n) from extension/retraction sensor 28, obtain luffing angle θx(n) from luffing sensor 30, obtain let-out amount l(n) of main wire rope 14 or sub wire rope 16 (hereinafter simply referred to as "wire rope") from winding sensor 34 and obtain three-axis accelerations Gx(n), Gy(n), Gz(n) from acceleration sensor 22.

Boom position computation section 31*b* can compute current position coordinate q(n) of the tip (position from which the wire rope is let out) of boom 9 (hereinafter simply referred to as "current position coordinate q(n) of boom 9"), which is a current position of the tip of boom 9, from obtained swivel angle θz(n), obtained extension/retraction length lb(n) and obtained luffing angle θx(n). Boom position computation section 31*b* also can compute current position coordinate p(1) of load W from computed current position coordinate q(1) of boom 9 and obtained let-out amount l(1) of the wire rope in a state in which crane apparatus 6 is stopped (n=1), and compute spring constant kf(2) of the wire rope from current position coordinate p(1) of load W, accelerations Gx(2), Gy(2), Gz(2) at unit time t(2) after a lapse of unit time t (n=2) and current position coordinate q(2) of boom 9 using Expression 1. In other words, boom position computation section 31*b* can compute spring constant kf(n) of the wire rope from previously-computed current position coordinate p(n−1) of load W at the time of a lapse of unit time t(n−1), accelerations Gx(n), Gy(n), Gz(n) at unit time t(n), which is a current time, and current position coordinate q(n) of boom 9 using Expression 1.

Then, boom position computation section 31*b* is configured to compute target position coordinate q(n+1) of boom 9 for target position coordinate p(n+1) of load W every unit time t from three-axis accelerations Gx(n), Gy(n), Gz(n) of load W, spring constant kf(n) of the wire rope and target position coordinate p(n+1) of load W using Expression 1.

Operation signal generation section 31*c* is a part of control apparatus 31 and generates operation signals Md for the actuators from target position coordinate q(n+1) of boom 9 after a lapse of unit time t(n+1). Operation signal generation section 31*c* can obtain target position coordinate q(n+1) of boom 9 after the lapse of unit time t(n+1) from boom position computation section 31*b*. Operation signal generation section 31*c* is configured to generate operation signals Md for swivel valve 23, extension/retraction valve 24, luffing valve 25, and main valve 26*m* or sub valve 26*s*.

A control process for computation of target course signal Pd for load W and computation of target position coordinate q(n+1) of the tip of boom 9 in order to generate operation signals Md in control apparatus 31 will more specifically be described below with reference to FIGS. 8 to 11.

Figure 8:
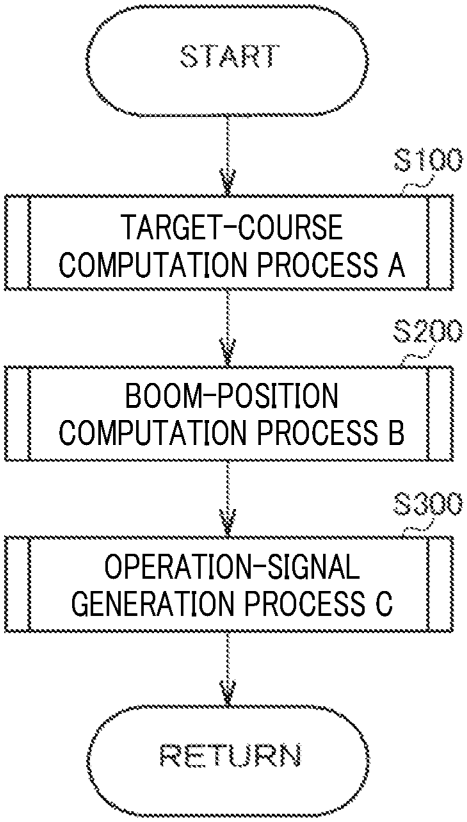
FIG. 8 is a flowchart illustrating a control process in a method of controlling the crane.
Figure 9:
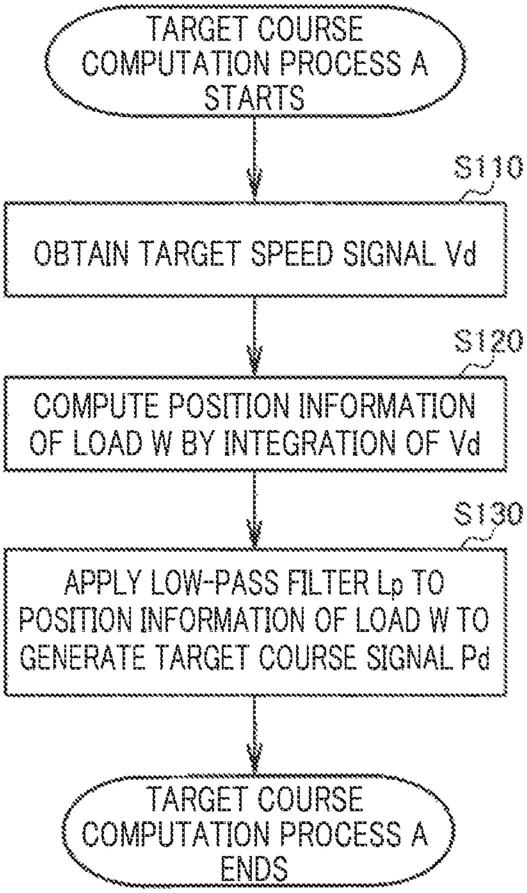
FIG. 9 is a flowchart illustrating a target-course computation process.

As illustrated in FIG. 8, in S100, control apparatus 31 starts target-course computation process A in a method for controlling crane 1 and makes the control proceed to step S110 (see FIG. 9). Then, upon completion of target-course computation process A, the control proceeds to step S200 (see FIG. 8).

Figure 10:
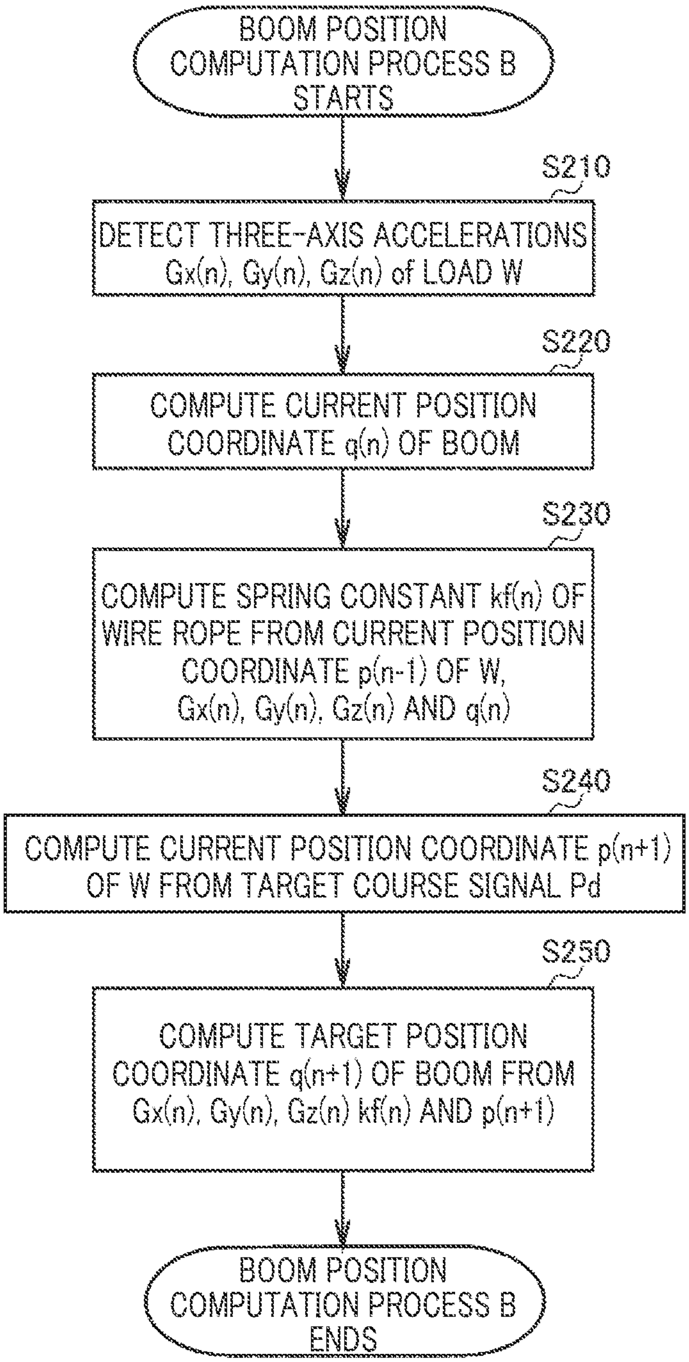
FIG. 10 is a flowchart illustrating a boom-position computation process.

In step 200, control apparatus 31 starts boom-position computation process B in the method for controlling crane 1, and makes the control proceed to step S210 (see FIG. 10). Then, upon completion of boom-position computation process B, the control proceeds to step S300 (see FIG. 8).

Figure 11:
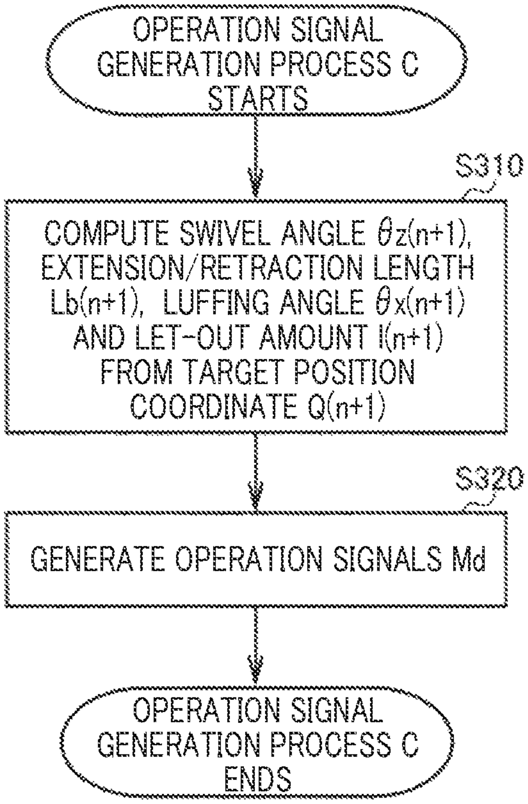
FIG. 11 is a flowchart illustrating an operation-signal generation process.

In step 300, control apparatus 31 starts operation-signal generation process C in the method for controlling crane 1, and makes the control proceed to step S310 (see FIG. 11). Then, upon completion of operation-signal generation process C, the control proceeds to step S100 (see FIG. 8).

As illustrated in FIG. 9, in step S110, target course computation section 31*a* of control apparatus 31 obtains target speed signal Vd for load W, target speed signal Vd being input, for example, in the form of a step function from manipulation terminal 32, and makes the control proceed to step S120.

In step S120, target course computation section 31*a* computes target positional information of load W by integrating obtained target speed signal Vd for load W, and makes the control proceed to step S130.

In step S130, target course computation section 31*a* computes target course signal Pd every unit time t by applying low-pass filter Lp, which is indicated by transfer function G(s) in Expression 2, to the computed target positional information of load W, and ends target-course computation process A and makes the control proceed to step S200 (see FIG. 8).

As illustrated in FIG. 10, in step S210, boom position computation section 31*b* of control apparatus 31 obtains three-axis accelerations Gx(n), Gy(n), Gz(n) from acceleration sensor 22, and makes the control proceed to step S220.

In step S220, boom position computation section 31*b* computes current position coordinate q(n) of boom 9 from obtained swivel angle θz(n) of swivel base 7, obtained extension/retraction length lb(n) and obtained luffing angle θx(n) of boom 9, and makes the control proceed to step S230.

In step S230, boom position computation section 31*b* computes spring constant kf(n) of the wire rope from previously-computed current position coordinate p(n−1) of load W at the time of a lapse of unit time t(n−1), obtained accelerations Gx(n), Gy(n), Gz(n) and obtained current position coordinate q(n) of boom 9 using Expression 1, and makes the control proceed to step S240.

In step S240, boom position computation section 31*b* computes target position coordinate p(n+1) of load W, which is a target position of the load after a lapse of unit time t, with reference to current position coordinate p(n) of load W from target course signal Pd, and makes the control proceed to step S250.

In step S250, boom position computation section 31*b* computes target position coordinate q(n+1) of boom 9 for target position coordinate p(n+1) of load W from three-axis accelerations Gx(n), Gy(n), Gz(n) of load W, spring constant kf(n) of the wire rope and target position coordinate p(n+1) of load W, and ends boom-position computation process B and makes the control proceed to step S300 (see FIG. 8).

As illustrated in FIG. 11, in step S310, operation signal generation section 31*c* of control apparatus 31 computes swivel angle θz(n+1) of swivel base 7, extension/retraction length Lb(n+1), luffing angle θx(n+1) and let-out amount l(n+1) of the wire rope after the lapse of unit time t from target position coordinate q(n+1) of boom 9, and makes the control proceed to step S320.

In step S320, operation signal generation section 31*c* generates respective operation signals Md for swivel valve 23, extension/retraction valve 24, luffing valve 25 and main valve 26*m* or sub valve 26*s* from computed swivel angle θz(n+1) of swivel base 7, computed extension/retraction length Lb(n+1), computed luffing angle θx(n+1) and computed let-out amount l(n+1) of the wire rope, and ends the operation-signal generation process C and makes the control proceed to step S100 (see FIG. 8).

Control apparatus 31 sequentially uses current position coordinate p(n) of load W computed unit time t before unit time t(n+1) for computation of target position coordinate q(n+2) of boom 9 unit time t after unit time t, by repeating target-course computation process A, boom-position computation process B and operation-signal generation process C every unit time t. Control apparatus 31 controls the actuators by means of feedforward control in which operation signals Md are generated based on target position coordinate q(n+2) of boom 9.

Crane 1 configured as described above computes target course signal Pd based on target speed signal Vd for load W, target speed signal Vd being arbitrarily input from manipulation terminal 32, and thus, is not limited to a prescribed speed pattern. Also, for crane 1, feedforward control in which a control signal for boom 9 is generated with reference to load W and a control signal for boom 9 is generated based on a target course intended by the operator is employed. Therefore, in crane 1, a delay in response to a manipulation signal is small and swinging of load W due to the delay in response is curbed. Also, since in crane 1, an inverse dynamics model is built, and target position coordinate q(n+1) of boom 9 is computed from three-axis accelerations Gx(n), Gy(n), Gz(n) of load W, previously-computed current position coordinate p(n−1) of load W unit time t before and target position coordinate p(n+1) of load W computed from target course signal Pd, no error occurs in a transient state due to acceleration/deceleration or the like. In addition, since crane 1 has no need to detect a current position coordinate of load W, acceleration sensor 22 only needs to be provided on load W or each of main hook block 10 and sub hook block 11. Consequently, crane 1 enables, when the actuators are controlled with reference to load W, moving load W along a target course while curbing swinging of load W.

Each of the embodiments described above merely indicate a typical mode and can be variously modified and carried out without departing from the essence of an embodiment. Furthermore, it is needless to say that the present invention can be carried out in various modes, and the scope of the present invention is defined by the terms of the claims and includes any modifications within the scope and meaning equivalent to the terms of the claims.

INDUSTRIAL APPLICABILITY

The present invention is applicable to a crane and a method for controlling the crane.

REFERENCE SIGNS LIST

1 Crane
6 Crane apparatus
9 Boom
22 Acceleration sensor
27 Swivel sensor
28 Extension/retraction sensor
30 Luffing sensor
43 Winding sensor
O Origin (Reference position)
Vd Target speed signal
p(n) Current position coordinate of load
p(n+1) Target position coordinate of load
q(n) Current position coordinate of boom
q(n+1) Target position coordinate of boom

The invention claimed is:

1. A crane comprising:

a boom;

an actuator of the boom;

control circuitry configured to control the actuator of the boom based on a target speed signal indicating a moving direction and a speed of a load suspended from the boom by a wire rope and a suspending tool, and thereby drive the boom and move the load; and an acceleration sensor configured to detect an acceleration of the suspending tool or the load, wherein the control circuitry is configured to:

convert, every predetermined unit time, the target speed signal into a target position of the load relative to a reference position;

compute, every unit time, a current position of a boom tip relative to the reference position from a swivel angle, a luffing angle and an extension/retraction length of the boom;

compute, every unit time, a spring constant of the wire rope from a previously-computed position of the load the unit time before, the current position of the boom tip relative to the reference position and a current acceleration of the suspending tool or the load, the current acceleration of the suspending tool or the load being detected by the acceleration sensor every unit time;

compute, every unit time, a target position of the boom tip for the target position of the load from the current acceleration of the suspending tool or the load, the spring constant of the wire rope, and the target position of the load;

generate, every unit time, an operation signal for the actuator based on the target position of the boom tip; and control the actuator in accordance with the operation signal.

2. The crane according to claim 1, wherein a relationship between the target position of the boom tip and the target position of the load is expressed by Expression 1 based on an acceleration of the load, a weight of the load, the spring constant of the wire rope and the target position of the load, and the control circuitry is further configured to:

compute, every unit time, the spring constant of the wire rope from the previously-computed position of the load the predetermined unit time before, the current position of the boom tip and the current acceleration of the suspending tool or the load using Expression 1; and compute, every unit time, the target position of the boom tip for the target position of the load from the current acceleration of the suspending tool or the load, the spring constant of the wire rope, and the target position of the load using Expression 1:

[1]

$$m\ddot{p}=mg+f=mg+k_f(q-p) \tag{1}$$

where f is a tension of the wire rope, kf is the spring constant, m is a mass of the load, q is the current position or the target position of the boom tip, p is the current position or the target position of the load, and g is a gravitational acceleration.

3. A crane controlling method in a crane comprising: a boom; an actuator of the boom; control circuitry for controlling the actuator of the boom based on a target speed signal indicating a moving direction and a speed of a load suspended from the boom by a wire rope and a suspending tool, to drive the boom and move the load; and an acceleration sensor configured to detect an acceleration of the suspending tool or the load, the method performed by the control circuitry, comprising:

converting, every predetermined unit time, the target speed signal into a target position of the load relative to a reference position;

computing, every unit time, a current position of a boom tip relative to the reference position from a swivel angle, a luffing angle and an extension/retraction length of the boom;

obtaining, every unit time, a current acceleration of the suspending tool or the load from the acceleration sensor;

computing, every unit time, a spring constant of the wire rope from a previously-computed position of the load the unit time before, a current position of a boom tip relative to the reference position and the current acceleration of the suspending tool or the load;

computing, every unit time, a target position of the boom tip for the target position of the load from the current acceleration of the suspending tool or the load, the spring constant of the wire rope and the target position of the load;

generating, every unit time, an operation signal for the actuator based on the target position of the boom tip; and controlling the actuator in accordance with the operation signal.

* * * * *